(12) United States Patent
Diorio et al.

(10) Patent No.: US 9,152,660 B2
(45) Date of Patent: Oct. 6, 2015

(54) DATA NORMALIZER

(76) Inventors: Donato Diorio, Pewaukee, WI (US);
Kevin Schuetz, Pewaukee, WI (US);
Igor Petrenko, Pewaukee, WI (US)

(*) Notice: Subject to any disclaimer, the term of this patent is extended or adjusted under 35 U.S.C. 154(b) by 283 days.

(21) Appl. No.: 12/842,804

(22) Filed: Jul. 23, 2010

(65) Prior Publication Data

US 2012/0023142 A1    Jan. 26, 2012

(51) Int. Cl.
*G06F 17/30* (2006.01)

(52) U.S. Cl.
CPC ................ *G06F 17/30303* (2013.01)

(58) Field of Classification Search
CPC .............................. G06F 17/30303
USPC ................................. 707/800–805
See application file for complete search history.

(56) References Cited

U.S. PATENT DOCUMENTS

| 6,247,043 | B1 | 6/2001 | Bates et al. |
| 6,658,423 | B1 | 12/2003 | Pugh et al. |
| 6,934,714 | B2 | 8/2005 | Meinig |
| 7,103,602 | B2 | 9/2006 | Black et al. |
| 7,360,174 | B2 | 4/2008 | Grossman et al. |
| 2008/0010243 | A1* | 1/2008 | Weissman et al. ............... 707/2 |
| 2008/0027895 | A1 | 1/2008 | Combaz |
| 2008/0249985 | A1* | 10/2008 | Kadambalil Baby et al. .... 707/3 |
| 2010/0042790 | A1 | 2/2010 | Mondal et al. |
| 2010/0095348 | A1* | 4/2010 | Foster et al. ...................... 726/1 |
| 2010/0174748 | A1* | 7/2010 | Strumpf et al. ............... 707/780 |

* cited by examiner

*Primary Examiner* — Syling Yen
*Assistant Examiner* — Navneet K Gmahl
(74) *Attorney, Agent, or Firm* — Absolute Technology Law Group, LLC

(57) ABSTRACT

A data normalizer for processing data for use by a CDM system which is capable of dynamically updating user-defined normalization criteria and which is further capable of operating in a multi-tenant environment in which each tenant has distinct data normalization policies.

18 Claims, 12 Drawing Sheets

DATA NORMALIZER

FIELD OF INVENTION

The present invention pertains to the field of computer devices for management of data, and more specifically to a computer apparatus configured with software to prepare data from disparate data sources for contact data management systems.

GLOSSARY

Figure 1:
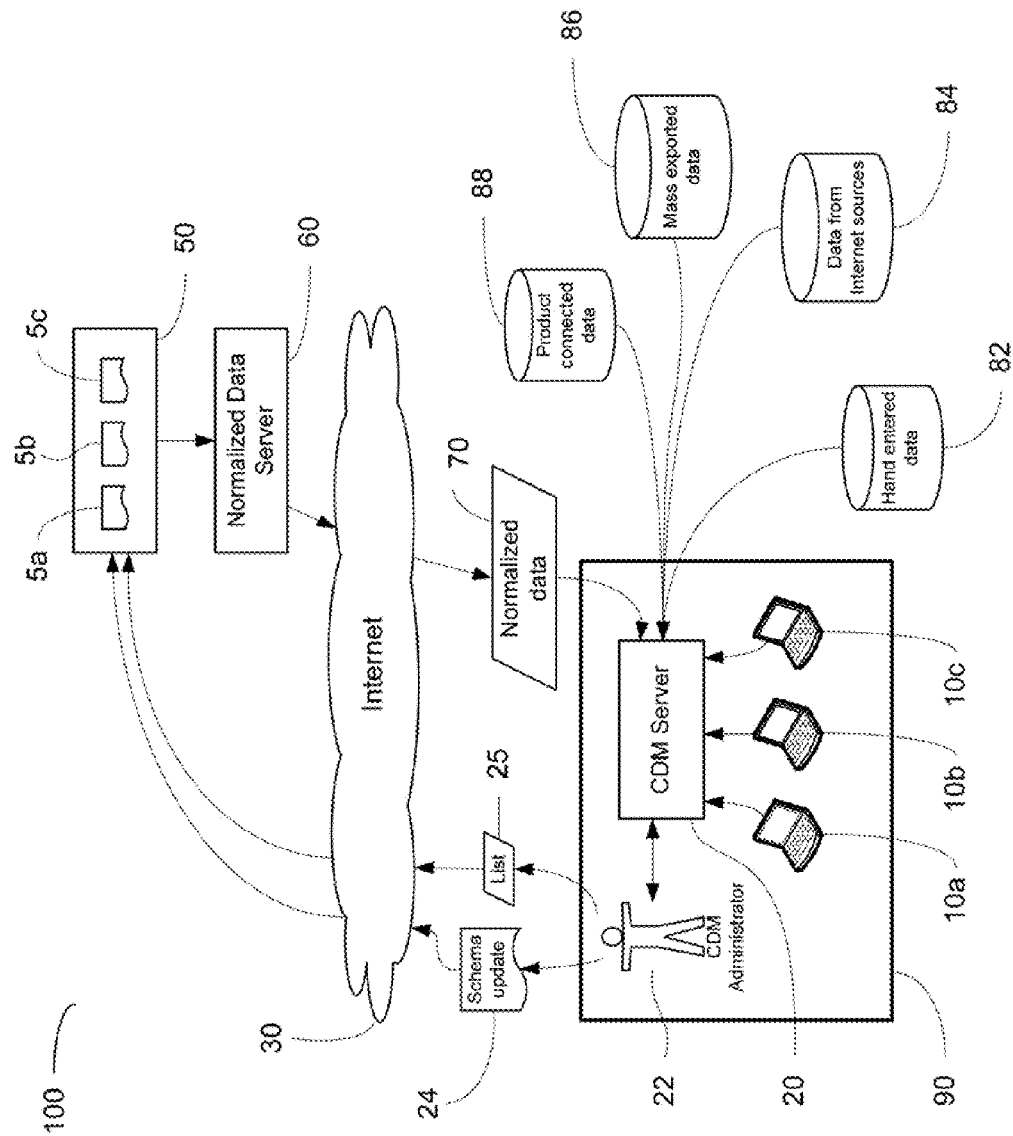
FIG. 1 illustrates an exemplary embodiment of a data normalizer with distributed network components capable of normalizing data from an infinite number of disparate data sources.

As used herein, the term "administrator" refers to a user which has authority to alter normalization schema for a tenant.

As used herein, the term "Contact Data Management (CDM) System" refers to any hardware and software configured with rules and or/protocols for managing contact data. A Contact Data Management System includes, but is not limited to, Customer Relationship Management (CRM) systems, application tracking systems (ATS), enterprise resource planning systems, personal information management systems, docket and calendar systems, accounting systems, database software, behavioral tracking software, demographic analysis tools, resource sharing tools, content sharing systems, data mining systems and combinations of the foregoing, including all functionally equivalent hardware and software tools and systems.

As used herein, the term "Customer Data Management (CDM) handoff" refers to any manner known in the art in which a CDM may receive data for processing, or may call commands from a computer configured with instructions for normalizing data.

As used herein, the term "data compilation" refers to the accumulation of data by any method, tool or from any source known in the art.

As used herein, the term "data" refers to information obtained from any source which is capable of being stored on a computer readable media.

As used herein, the term "data gathering tool" refers to an apparatus configured with instructions capable of gathering data from one or more sources (including, but not limited to web sites, compilations, purchased lists, assembled lists, profiles, social networking resources, demographic research, applications, scanned forms, billing information, census data, public repositories of information, registration records, medical records, biological data information tracking databases, security records, transaction databases or any other data source containing information about person or entity). A data gathering tool may include internal processing tools which periodically check or accumulate data internally.

As used herein, the term "data handoff function" refers to the transfer of normalized data to a CDM.

As used herein, the term "disparate data source(s)" refers to data that is collected from more than one data source known in the art (including but not limited to web sites, compilations, purchased lists, assembled lists, profiles, social networking resources, demographic research, applications, scanned forms, billing information, census data, public repositories of information, registration records, medical records, biological data information tracking databases, security records, transaction databases or any other data source containing information about person or entity).

As used herein, the term "hand keyed data" refers to data physically entered by an administrator and/or a user.

As used herein, the term "mass exported data" refers to data deliberately exported in a large quantity from an identified data source.

As used herein, the term "module" refers to a portion of computer hardware or a memory storage component configured with instructions to perform a task.

As used herein, the term "multi-tenant environment" refers to an environment which includes one or more tenants.

As used herein, the term "normalization schema" refers to a set of normalization policies, protocols and/or criteria to be used for data normalization. Some examples of normalization schema may include normalization policies for addressing spelling, punctuation, abbreviations, reconstructed data, deconstructed data, spelling standards, abbreviations, symbols, character conventions, spacing, prefixes, suffixes, and ordinals.

As used herein, the term "normalized data" refers to data which has been processed according to normalization schema determined by an administrator.

As used herein, the term "normalizing data" refers to the process of conforming data records based upon an administrator-defined set of data normalization.

As used herein, the term "normalizing module" refers to a portion of hardware or storage media configured with instructions for normalizing data.

As used herein, the term "normalizing policy" refers to criteria for normalizing data. A normalization schema is comprised of one of more normalization policies. Selection of normalizing schema may be made by a user, administrator or tenant. Examples of normalizing policies include, but are not limited to, spelling, punctuation, abbreviations, reconstructed data, deconstructed data, spelling standards, abbreviations, symbols, character conventions, spacing, prefixes, suffixes, and ordinals. Normalizing policies may also be based on results of comparisons of data to one or more databases and include policies for conforming data.

As used herein, the term "potential duplicate information" or "duplicate information" refers to any unit of data that is determined to be redundant or inaccurate based on any protocols determined by a tenant, user or administrator.

As used herein, the term "received data" means data received for inclusion in a CDM system derived from one or more data sources.

As used herein, the term "tenant" refers to any user or designated group of users of CDM data. A tenant may have one or more users that are designated as an administrator.

As used herein, the term "user" refers to any end user or administrator that receives or manipulates data in a CDM system.

As used herein, the term "user-selected" refers to any option selected by a user.

As used herein, the term "web-based" refers to any tool, component or service which is accessed from outside of the local area network of a user or tenant which operates on that network.

BACKGROUND

Businesses and individuals increasingly rely on management of contact data for communication, marketing, monitoring and other basic functions.

Management of data about persons or entities through Contact Data Management (CDM) Systems is a multi-billion dollar market, which experiences double digit growth each year, and which includes, but is not limited to, Contact Resource Management (CRM) systems. Management of contact data is critical to domestic and global productivity, and businesses of all sizes increasingly depend on the effective implementation of all business functions. It is also critical to governments and medical institutions and for security and tracking purposes.

A problem common to all CDM systems is the duplication of data entered into the system. It is estimated that most large scale CDM systems experience fluctuating duplication rates between 10 to 30 percent, and must devote considerable system resources to addressing complications caused by the duplication of data.

Because most CDM systems require periodic repetition of de-duplication processes, CDM systems experience fluctuating duplication rates between the times that the de-duplication process is performed rendering them more error prone.

Errors and redundant resources allocated to duplicated data cause a loss of business productivity, and compromise the overall functionality of CDM systems.

A typical scenario occurs when customer records are recorded in an inconsistent manner. For example, a contact may be shown as salesman Mary Smith in a company, "GRP Transport, Srvcs." A second listing may appear for Bob Jones with "Group Transportation Services." Several types of problems may arise from this hypothetical scenario.

One problem that may arise from this hypothetical may be that the contact entity receives multiple mailings or calls from the end user. Another problem is that the end user of the CDM system may not ever have consistent information about each customer. The customer information may be inconsistent because every time the customer record has to be updated, only one record is updated. There is no assurance that the most recently updated record will be subsequently revised, which results in inconsistent information being accessed. Another problem with duplicated records is that the end user is unable to accurately monitor user activity. Another type of problem may occur when multiple client personnel are contacted by the user's staff and duplicate services are rendered or inconsistent pricing and/or information is offered.

Data entered into a CDM may come from various sources (e.g., list broker services, hand entered data, web crawled data, social networks, association lists, magazine subscriber lists, e-mail signatures). Each of these disparate data sources may obey different rules on how they treat data, or may have no rules. As data is gathered using increasingly sophisticated technology and data mining tools, new types of data duplication errors and data record inconsistencies (e.g., spelling, abbreviation, punctuation, deconstruction, reconstruction anomalies and other differences in records referencing the same contact in disparate data sources) occur more frequently. De-duplication processes in existing CRM and CDM technologies cannot be effective unless data is conformed ("normalized") so that it can be adequately compared. Moreover, decisions on how to normalize data and the conventions to be used for normalizing data can differ greatly depending on the needs of a particular user (tenant) environment.

Most CRM and CDM de-duplication technologies rely on "library-style" retrieval, hash code and character comparisons to detect duplicates. These CRM and CDM components are not effective for screening massive amounts of data from disparate data sources during an updating process. The de-duplication components of CDM and CRM systems known in the art are also not designed to be dynamically updated to anticipate an infinite number of disparate data sources and tenants with unique requirements.

It is desirable to have a data normalization tool which can interface with various CDM systems and process data from infinite disparate data sources.

It is further desirable to have a tool which can normalize data specific to the needs of one or more tenants, and which can be adapted for multi-tenant environments.

It is further desirable to have a tool that can be dynamically updated to normalize data and to address an evolving range of potential data entry variations that can result from changes in data retrieval technology.

SUMMARY OF THE INVENTION

The present invention is a data normalizer which can be adapted for use for various CDM systems, including commercially available and CRM systems. The data normalizer prepares data for de-duplication by the CDM system and is configured to handoff data for processing to one or more CDM systems. In various embodiments, the data normalizer may be a web-based service or a software module compatible with existing CDM products, while in other embodiments the data normalizer may reside on the same local area network or devices as the CDM system. In various embodiments the data normalizer tool may be adapted for use in multi-tenant environments having disparate CDM needs and/or CDM systems. Normalization protocols may be dynamically updated. In various embodiments, the data normalizer allows an administrator to customize normalization schema, and to dynamically alter normalization schema.

DETAILED DESCRIPTION OF INVENTION

For the purpose of promoting an understanding of the present invention, references are made in the text to exemplary embodiments of a data normalizer, only some of which are described herein. It should be understood that no limitations on the scope of the invention are intended by describing these exemplary embodiments. One of ordinary skill in the art will readily appreciate that alternate, but functionally equivalent data normalizers may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the instructions which are set forth are exemplary, and may be performed in any order or combined with other instructions to achieve substantially equivalent functionality.

FIG. 1 is an exemplary embodiment of a data normalizer system 100 operating over a geographically distributed wide area network. In the exemplary embodiment shown, data normalizer system 100 includes normalizing schema server 50 which is a computer readable media which tracks the normalizing policies 5a, 5b, and 5c and policy updates 24 comprising the schema for tenant 90. In the embodiment shown, tenant 90 is a business entity which uses a CDM system which resides on the tenant's network. In other embodiments, the tenant may have a CDM system which resides on a server outside the tenant's network, and be accessed by the tenant over the internet.

In the embodiment shown, normalizing policies 5a, 5b, and 5c are determined by each tenant 90 by selecting normalization schema for use in that particular tenant's environment.

In the embodiment shown, tenant 90 is using a CDM system known in the art, but in other embodiments, tenant 90 may be using one or more disparate CDM systems or multiple CDM systems in conjunction with data normalizer system 100, and each tenant 90 may be using normalizing policies 5a, 5b, and 5c determined by an administrator, which in the embodiment shown is CDM administrator 22. An administrator may be a single user with administrative privileges.

As shown in FIG. 1, normalizing schema server 50 is a computer readable media for storing normalized policies 5a, 5b, and 5c. In the exemplary embodiment shown, normalizing schema server 50 associates schema updates 24 with the normalizing policies 5a, 5b, and 5c as specified by CDM administrator 22 and/or users 10a, 10b, and 10c. Normalizing policies 5a, 5b, and 5c are updated using the graphical user interface 705 discussed in FIG. 7. In the embodiment shown, normalized data server 60 is a computer apparatus configured with software and has processing components capable of using normalization schema to create normalizing policies which are applied data to be normalized.

In various embodiments, normalizing schema server 50 and normalized data server 60 processes data based on normalization schema selected and updated by any CDM administrator 22 or users 10a, 10b, and 10c with privileges to create or update normalizing policies.

In the exemplary embodiment shown, list 25 is data passed to CDM system by CDM administrator 22.

Data normalizer system 100 further includes normalized data server 60 which applies normalizing policies 5a, 5b, and 5c to data which is passed to and from the CDM system.

In the embodiment shown, CRM administrator is an individual, entity or server with the ability to modify normalizing policies 5a, 5b, and 5c.

Figure 2:
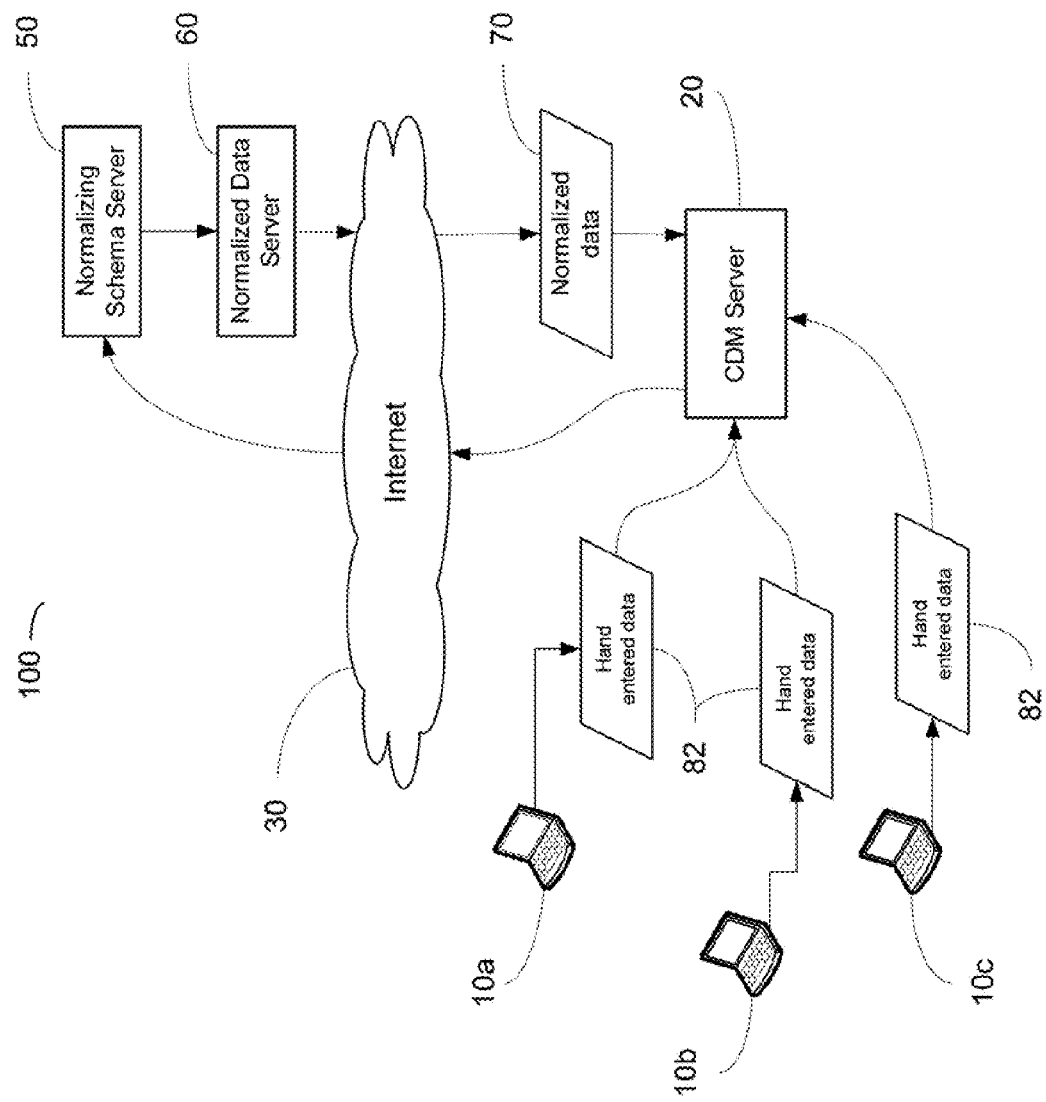
FIG. 2 illustrates an exemplary embodiment of a data normalizer with distributed network components which uses hand keyed data which is entered by users.

FIG. 2 illustrates an exemplary embodiment of a data normalizer in use to process data which is keyed in by users 10a, 10b, and 10c as hand entered data 82.

Data is passed to CDM server 20 and CDM server 20 passes data over the internet to normalizing schema server 50 which tracks normalizing policy and schema updates and assigns an appropriate normalizing schema based on the tenant. Normalized data server 60 applies the appropriate normalizing polices to data which is returned to the CDM server 20 as normalized data 70.

Figure 3:
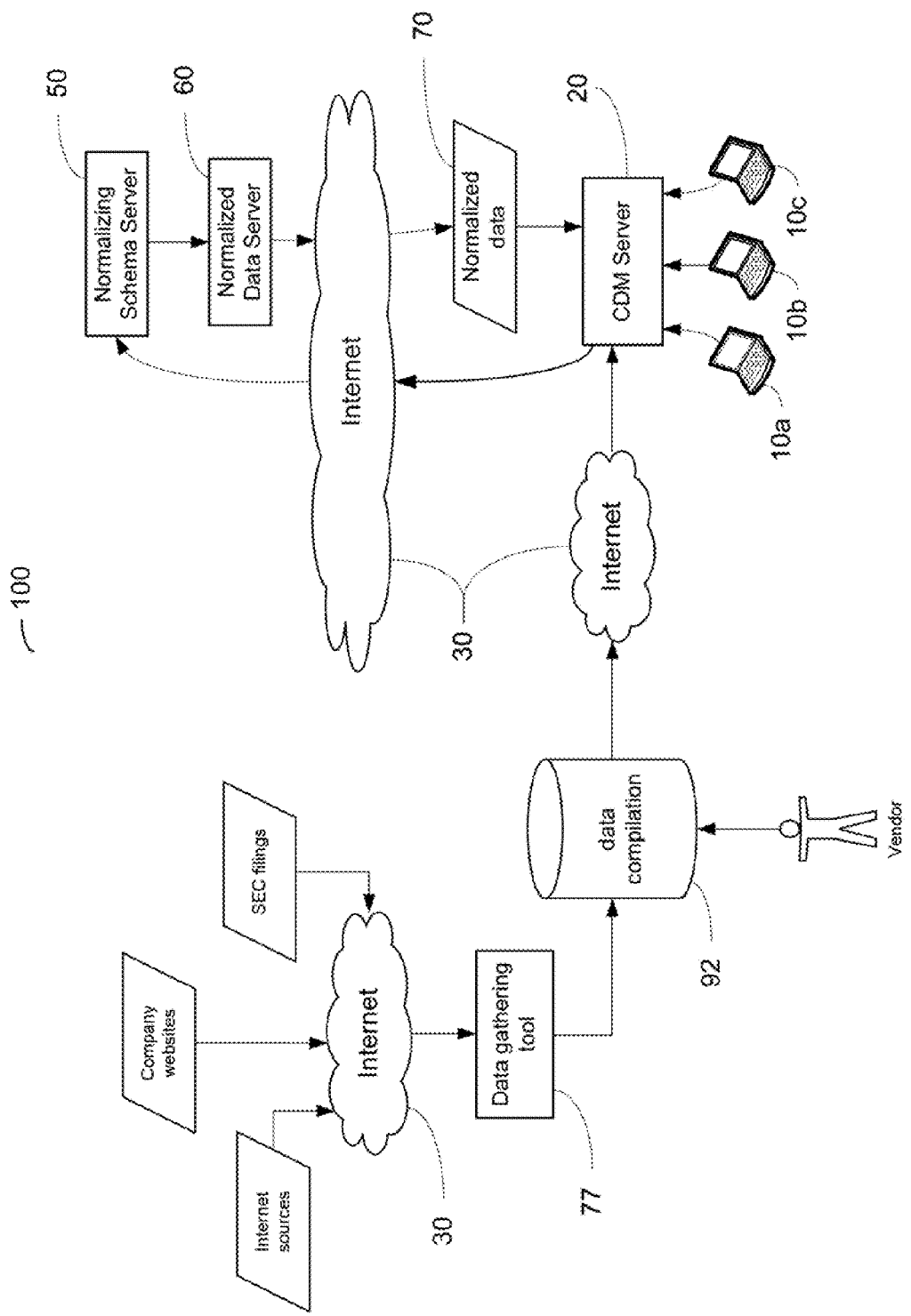
FIG. 3 illustrates an exemplary embodiment of a data normalizer with distributed network components which uses data compiled using a data gathering tool.

FIG. 3 illustrates data compiled by a data gathering tool 77 directly. Data is passed to CDM server 20, which passes data to be normalized over the internet 30 to normalizing schema sever 50 and normalized data server 60, and normalized data 70 is returned for use by CDM server 20.

Figure 4:
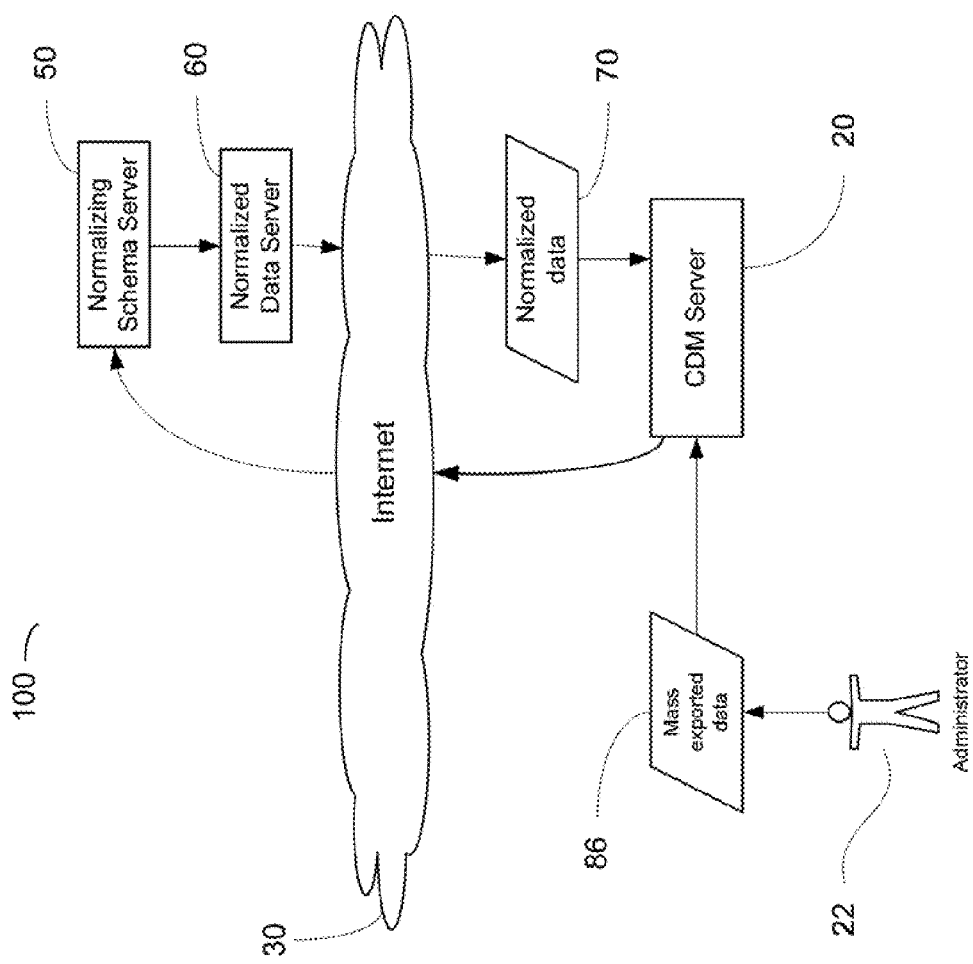
FIG. 4 illustrates an exemplary embodiment of a data normalizer which processes mass exported data.

FIG. 4 illustrates mass exported data 86 directly loaded by a CDM administrator 22 into a CDM server 20, which is then passed to a normalizing schema server 50.

Mass exported data 86 is then passed to a normalized data server 60, which passes the mass exported data 86 over the internet 30 to the CDM server 20 as normalized data 70.

Figure 5:
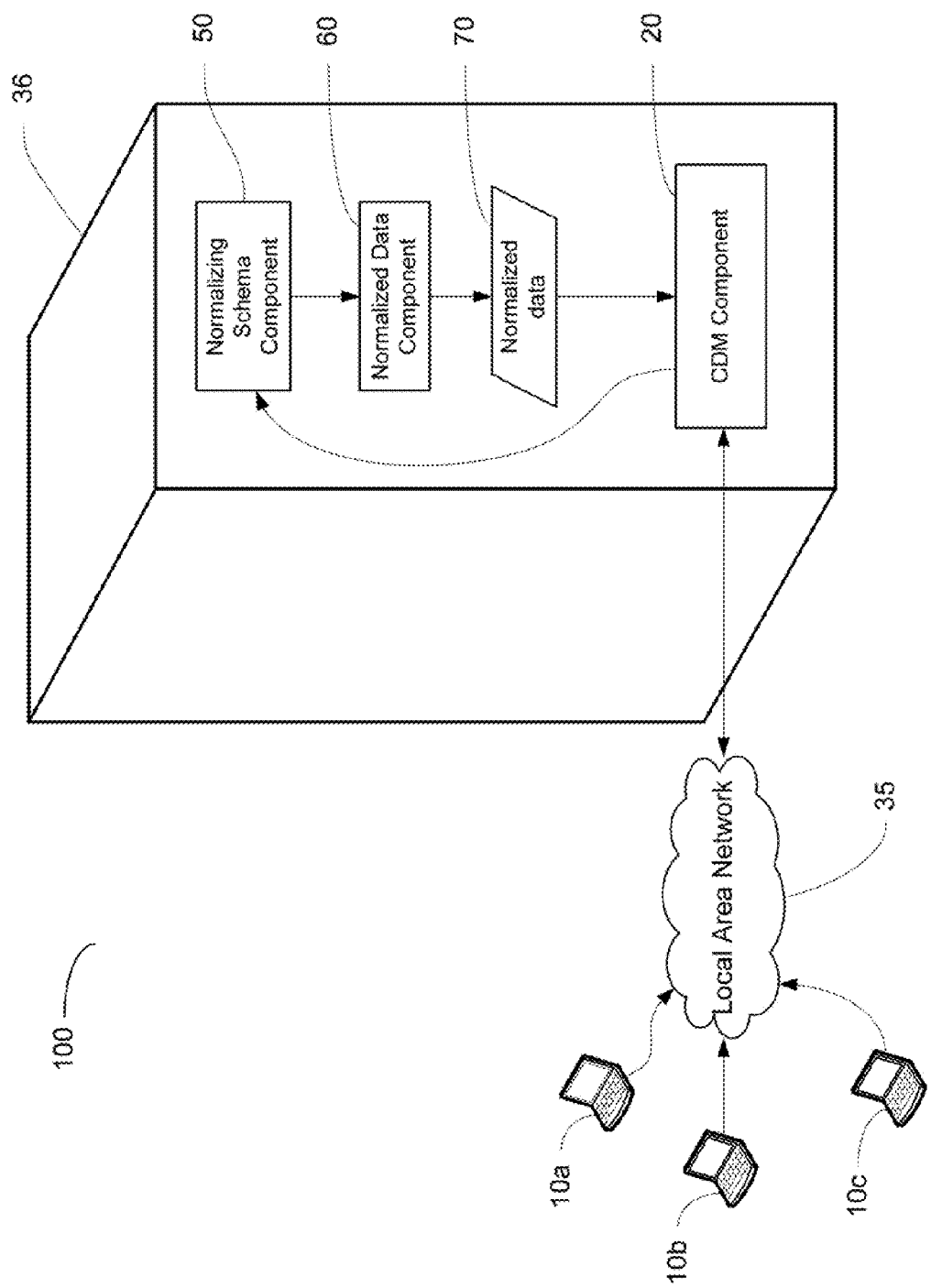
FIG. 5 illustrates an exemplary embodiment of a data normalizer which resides on a local area network.

FIG. 5 illustrates an exemplary embodiment of a data normalizer system 100 which resides on a local area network (LAN) 35 with a CDM network sever 36 and which may be purchased by a client or a software vendor to be used with a particular CDM system.

The CDM network server 36 illustrated in FIG. 5 includes normalizing schema component 50, normalized data component 60, and CDM component 20, all of which reside on a single server or LAN 35 and which are accessed by users 10a, 10b, and 10c.

Figure 6:
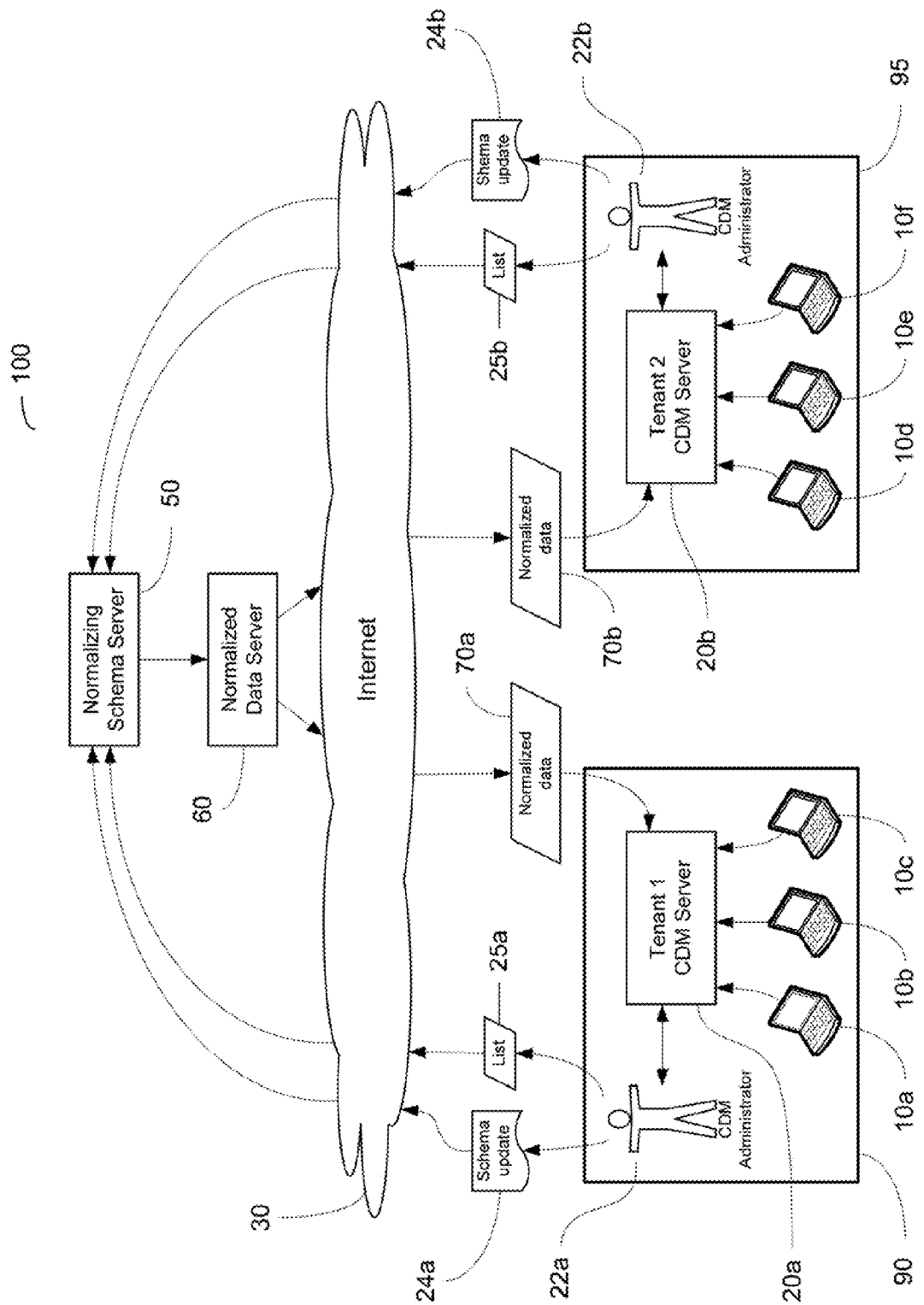
FIG. 6 illustrates an exemplary embodiment of a data normalizer with distributed network components capable of normalizing data in a multi-tenant environment.

FIG. 6 illustrates an exemplary embodiment of a data normalizer system 100 with distributed network components capable of normalizing data in a multi-tenant environment. In the embodiment shown, data normalizer system 100 serves tenants 90 and 95. In other embodiments, data normalizer system 100 may serve more or fewer tenants, and tenants may be distributed over a WAN or LAN.

As FIG. 6 illustrates, each tenant 90 and 95 has its own normalized data 70a and 70b, lists 25a and 25b, and schema updates 24a and 24b. Normalizing schema server 50 and normalized data server 60 serve tenants 90 and 95.

Figure 7A:
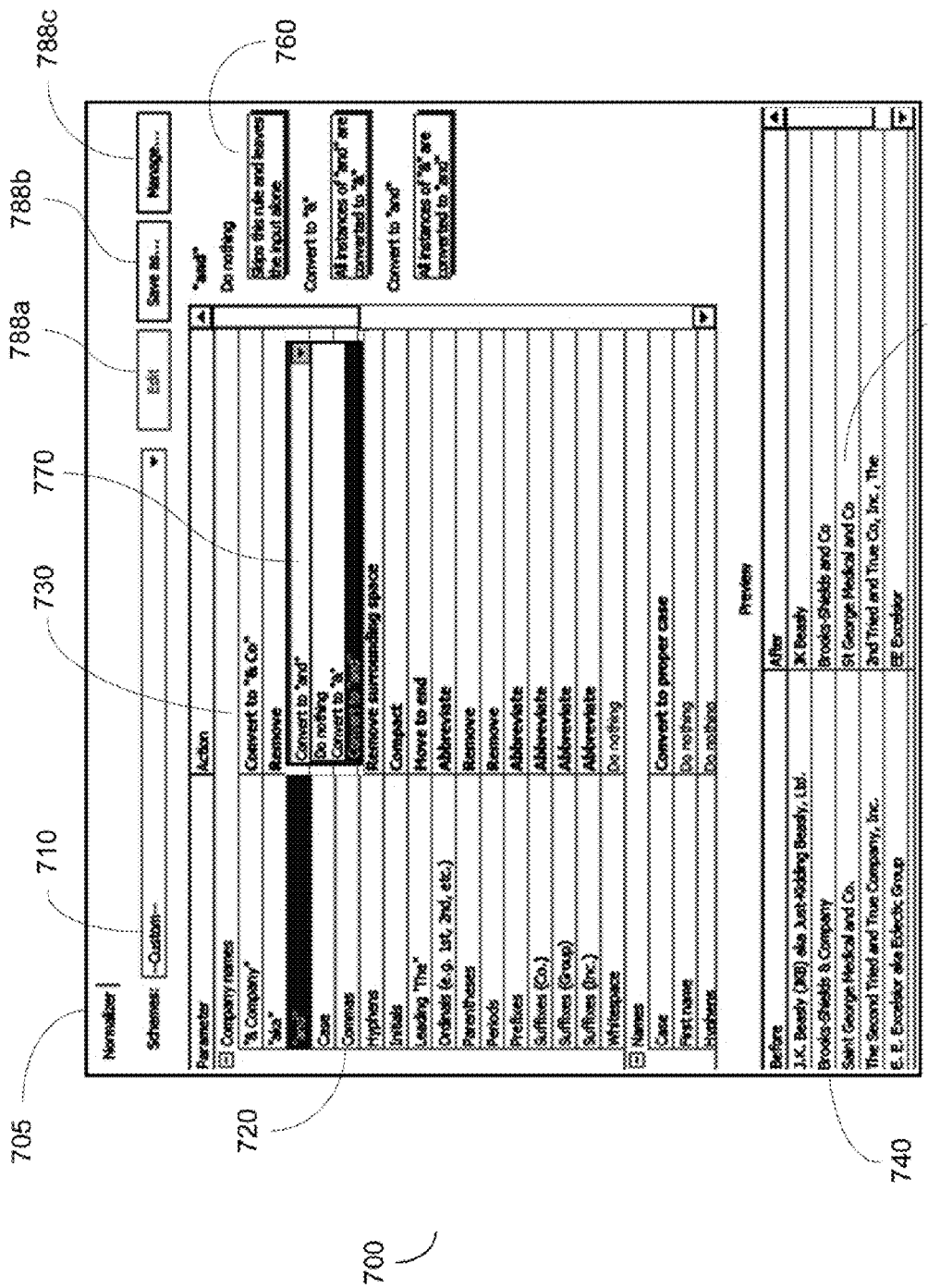
FIGS. 7a and 7b illustrate exemplary graphical user interfaces for creating normalizer schema and schema updates to customize the functionality of a data normalizer.

FIG. 7a illustrates an exemplary graphical user interface 705 which displays multiple normalization schemas 730 and 770. Normalization schema 730 and 770 are rules which are applied by normalizing policies. Exemplary normalization schema 730 and 770 include do nothing, convert "and" to "&," convert "&" to "and," and to abbreviate various prefixes and suffixes such as "incorporation" and "company."

The embodiment shown illustrates a graphical user interface 705 in which a user can select from numerous normalization schema 730 and 770. An infinite number of normalization schemas can be added to a graphical user interface (GUI) 705, and normalization may be accomplished by treating recognized data, reconstructed data and deconstructed data to any rule imposed or devised by a CDM administrator and/or user. In still other embodiments, data may be normalized using the interim step of comparative database analysis, as later illustrated in FIG. 9.

Also shown in FIG. 7a are the following GUI options: parameters 720 which are specific words, ordinals and/or symbols in data that a user may want normalized, actions 730 which include the normalization schema a user may choose to normalize the parameter 720 selected, before 740 which displays a preview of what the data looked like before normalization, preview 750 which displays what the data will look like following normalization, and help screens 760 for explaining the function of each normalization schema/action 730 and 770. Function buttons 788a, 788b, and 788c allow a user to edit, save or manage changes made on the graphical user interface 720.

Figure 7B:
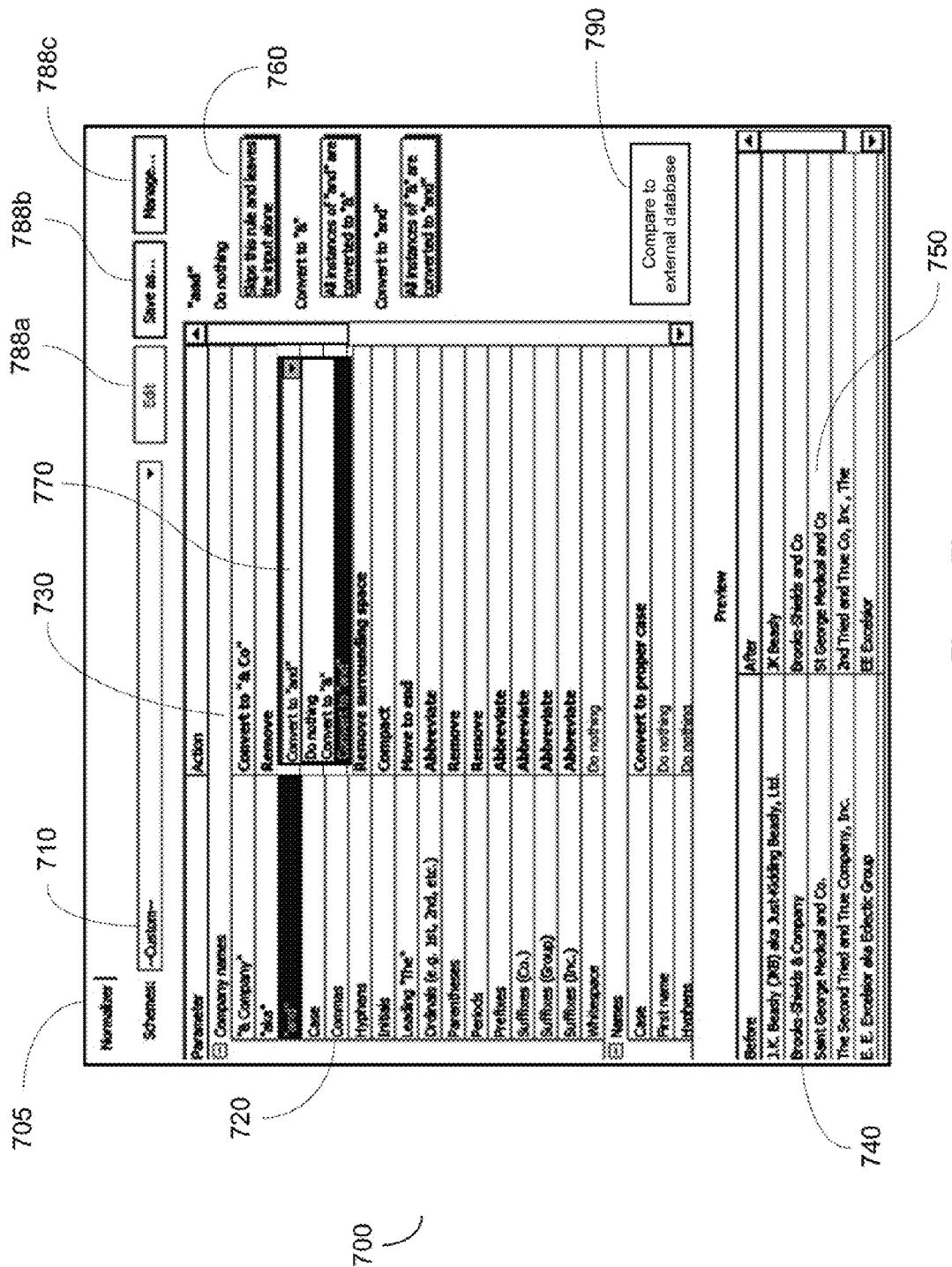

FIG. 7b illustrates a graphical user interface as in FIG. 7a, but also includes a function button for comparison to external databases 790.

Figure 8:
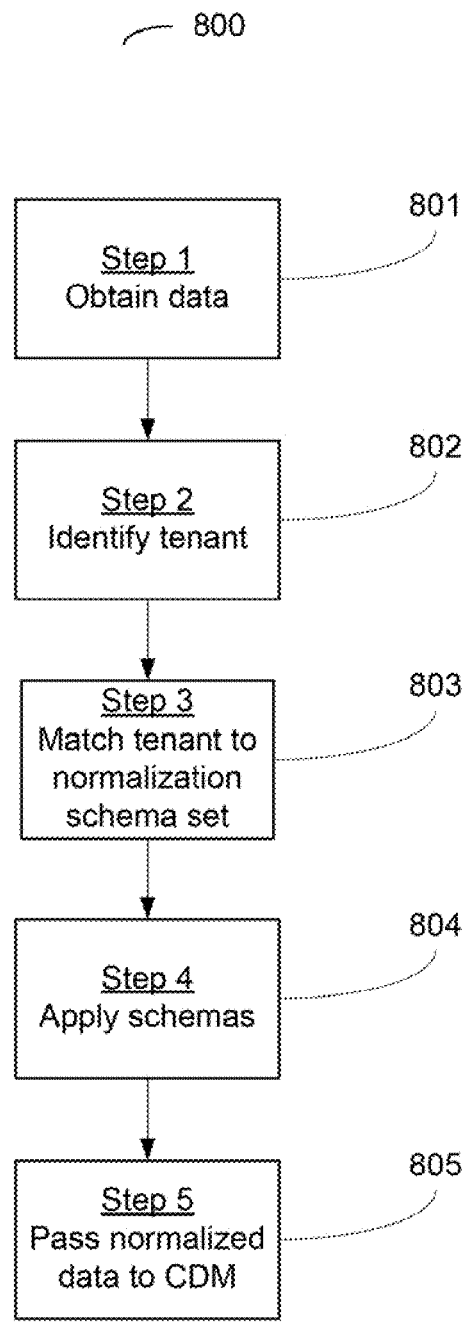
FIG. 8 is an exemplary set of instructions with which a computer apparatus may be configured to perform data normalization for multiple contact data systems in a multi-tenant environment.

FIG. 8 illustrates an exemplary set of instructions 800 with which a computer apparatus may be configured to perform data normalization for multiple contact data systems in a multi-tenant environment. In Step 1 801, the computer apparatus obtains data. The tenant is identified in Step 2 802, and the tenant is matched to its normalization schema set 803. The normalization schemas get applied 804 and the normalized data is passed to the CDM 805.

Figure 9:
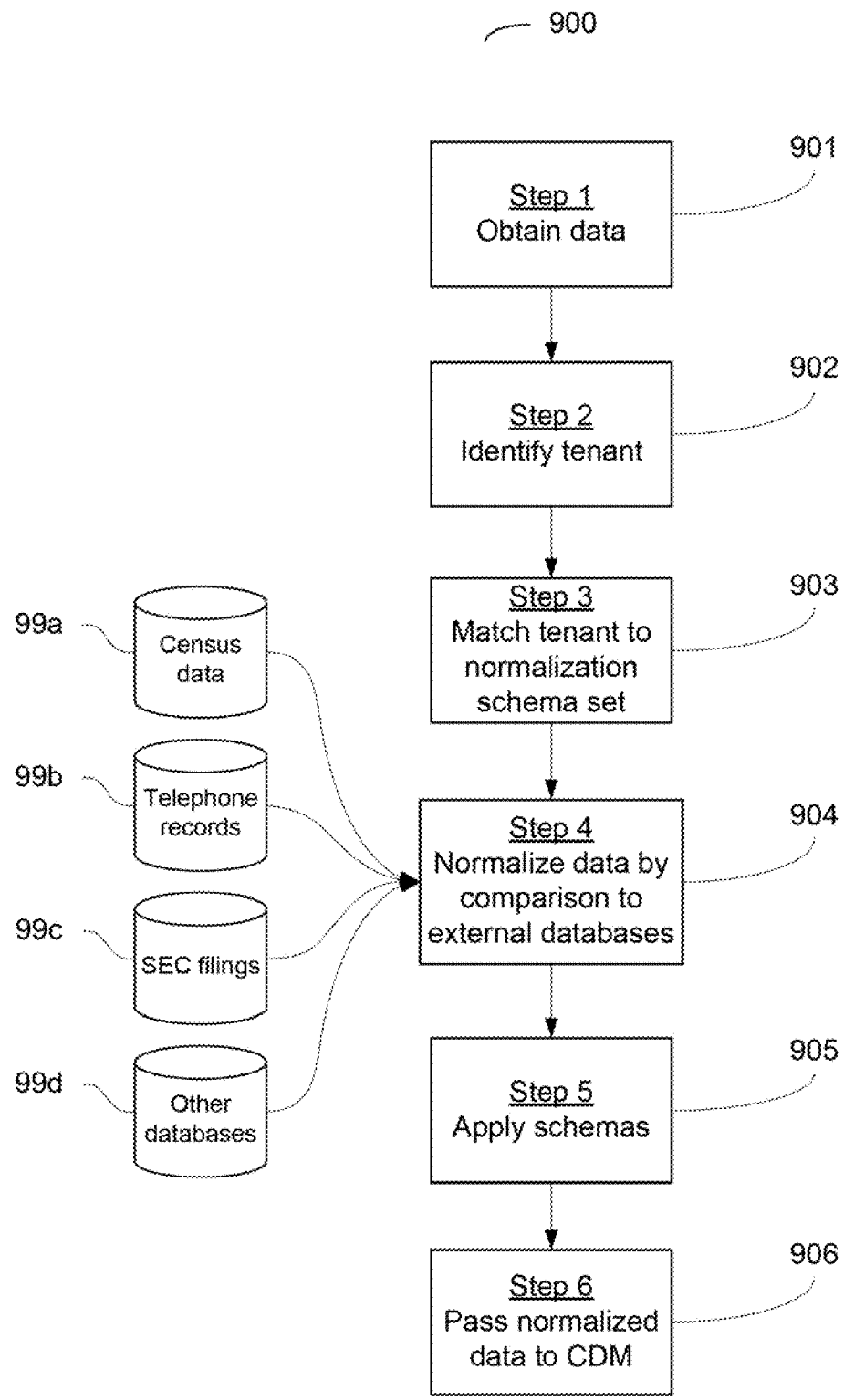
FIG. 9 is an exemplary set of instructions with which a computer apparatus may be configured for normalized data utilizing one or more external databases.

FIG. 9 illustrates an exemplary set of instructions 900 with which a computer apparatus may be configured for normalized data utilizing one or more external databases. For example, data may be compared for accuracy to public records and other databases. In Step 1 901, the computer apparatus obtains data. The tenant is identified in Step 2 902, and the tenant is matched to its normalization schema set 903. In Step 4 904, the computer apparatus then normalizes the data by comparison to external databases 99a, 99b, 99c, and 99d. The normalization schemas are then applied 905, and the normalized data is passed to the CDM 906.

Figure 10:
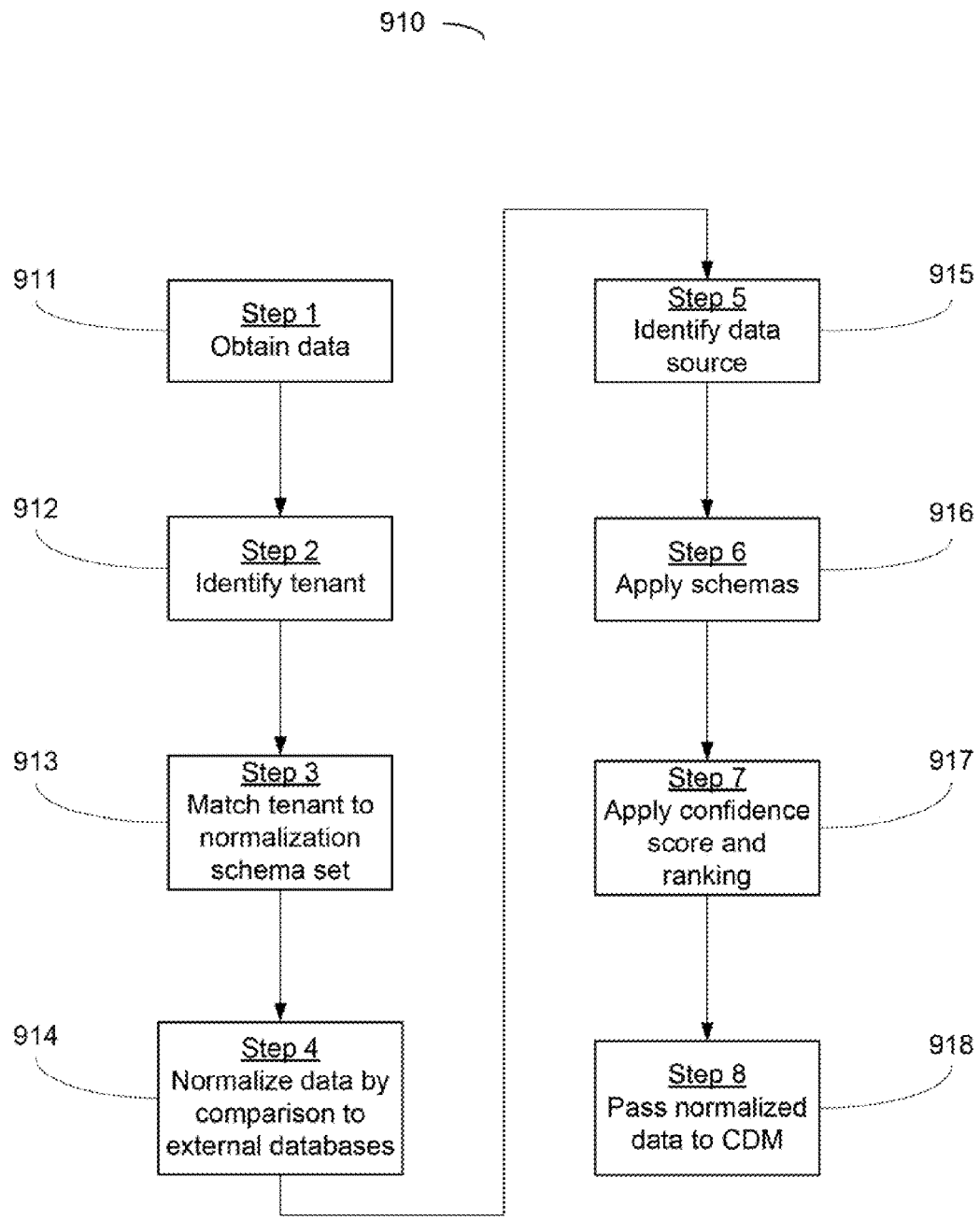
FIG. 10 is an exemplary set of instructions which assigns a confidence rating and score to normalized data based on the data source.

FIG. 10 is an exemplary set of instructions which assigns a confidence rating and score to normalized data based on the data source. In Step 1 911, the data is obtained. The tenant is identified in Step 2 912, and the tenant is matched to its normalization schema set 913. The data is normalized by comparison to external databases 914, and the data source is identified 915. The normalization schemas are then applied to the data 916, and a confidence score and ranking are applied 917. The normalized data containing the confidence score and rating is finally passed to the CDM 918.

Figure 11:
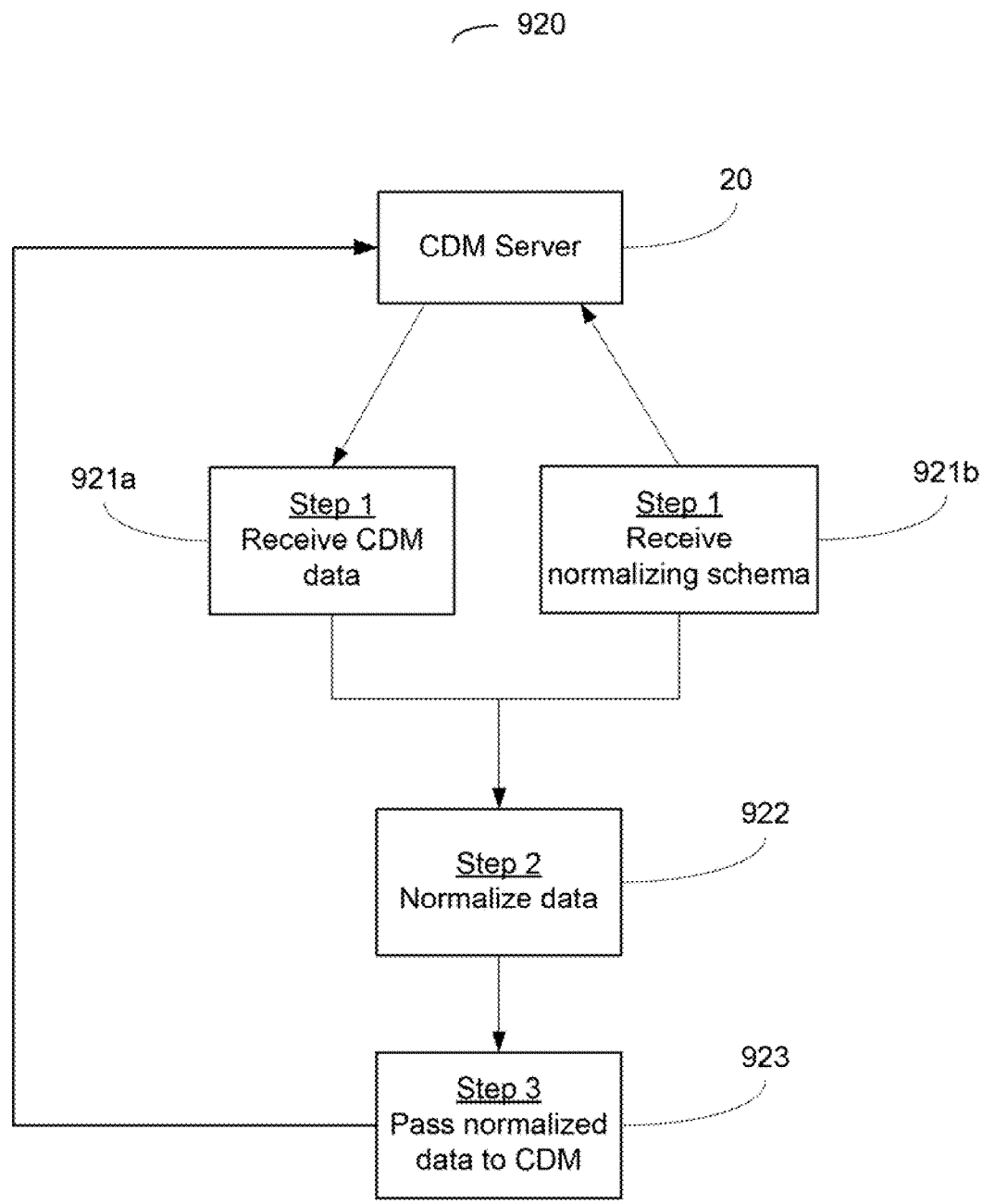
FIG. 11 illustrates an exemplary data handoff function.

FIG. 11 illustrates an exemplary CDM handoff 920. Data from the CDM server 20 is received 921a in conjunction with a normalizing schema 921b. The normalizing schema is used to normalize the data 922 and in Step 3 923, the normalized data is passed back to the CDM server 20, which will continue to apply the normalizing schema.

What is claimed is:

1. A computer apparatus comprised of:
    a normalization processing component configured to receive mass exported data from disparate data sources for a plurality of tenants,
        wherein each of said plurality of tenants uses heterogeneous Contact Data Management (CDM) systems,
        wherein said normalization processing component is further configured to return normalized data to each of said heterogeneous systems,
        wherein said mass exported data is normalized by said normalization processing component based on a data normalization policy associated with each tenant,
        wherein said mass exported data is normalized using at least one normalization schema comprised of standard semantic and linguistic character combinations utilized in all CDM systems,
        wherein said normalization processing component further includes a set of computer readable instructions to retrieve said normalization schema and compare said normalization schema to data in an external database and to assign a reliability score to said data based on said external database.

2. The apparatus of claim 1 which further includes at least one computer readable media for storing said at least one data normalization schema.

3. The apparatus of claim 1 which further includes a component for updating said at least one data normalization policy which is used to create at least one updated data normalization schema in real time.

4. The apparatus of claim 3 wherein said normalization processing component includes an open source software component configured to enable a user to update said at least one updated data normalization policy by updating an open source database of normalization schema.

5. The apparatus of claim 1 wherein said at least one data normalization schema calls functions which transform data to be consistent with normalization schema.

6. The apparatus of claim 1 wherein said normalization processing component is web-based and associates said at least one data normalization schema with at least one tenant in a multi-user environment.

7. The apparatus of claim 3 which associates said at least one updated data normalization schema with at least one tenant.

8. The apparatus of claim 1 which is configured to perform a data handoff function to at least one CDM system.

9. The apparatus of claim 1 which is further configured to perform a data handoff function to a plurality of CDM systems.

10. The apparatus of claim 1 wherein said at least one normalization processing component is web-based.

11. The apparatus of claim 1 wherein said at least one normalization processing component resides on a local area network with at least one CDM.

12. The apparatus of claim 7 which is further configured with software to allow said computer apparatus to perform a data handoff function to at least one user-selected CDM system.

13. The apparatus of claim 1 wherein said at least one data source is selected from a group consisting of keyed data, mass exported data, and data obtained by a data gathering tool.

14. A data preprocessing apparatus comprised of:
    at least one computer having at least one CDM system;
    at least one collection module configured to interface with said at least one CDM system and obtaining data collected by said at least one CDM system; and
    a normalization processing component configured to receive mass exported data from disparate data sources for a plurality of tenants,
        wherein each of said plurality of tenants uses heterogeneous CDM systems,
        wherein said normalization processing component is further configured to return normalized data to each of said heterogeneous systems,
        wherein said mass exported data is normalized by said normalization processing component based on a data normalization policy associated with each tenant,
        wherein said mass exported data is normalized using at least one normalization schema comprised of standard semantic and linguistic character combinations utilized in all CDM systems,
        wherein said normalization processing component further includes a set of computer readable instructions to retrieve said normalization schema and compare said normalization schema to data in an external database and to assign a reliability score to said data based on said external database.

15. The apparatus of claim 14 which includes at least one normalization policy tracking component which is configured to update said at least one normalization schema with at least one tenant.

16. The apparatus of claim 14 which is further configured to update said at least one normalization schema to create an updated normalization schema and associating said updated normalization schema with at least one normalization policy to create an updated normalization schema.

17. The apparatus of claim 14 wherein said at least one normalization schema is updated by at least one administrator in real time using a graphical user interface.

18. The apparatus of claim 14 wherein said at least one normalization schema includes computer readable instructions to compare data derived from a first database to data contained in a second database.

\* \* \* \* \*